(12) United States Patent
Attarwala et al.

(10) Patent No.: US 12,180,395 B2
(45) Date of Patent: Dec. 31, 2024

(54) TWO-PART, CYANOACRYLATE/FREE RADICALLY CURABLE ADHESIVE SYSTEMS

(71) Applicant: Henkel IP & Holding GmbH, Duesseldorf (DE)

(72) Inventors: Shabbir T. Attarwala, Simsbury, CT (US); Chetan Hire, Glastonbury, CT (US); Jesse Davis, Hartford, CT (US)

(73) Assignee: Henkel AG & Co. KGaA, Duesseldorf (DE)

( * ) Notice: Subject to any disclaimer, the term of this patent is extended or adjusted under 35 U.S.C. 154(b) by 298 days.

(21) Appl. No.: 17/232,683

(22) Filed: Apr. 16, 2021

(65) Prior Publication Data

US 2021/0253907 A1 Aug. 19, 2021

Related U.S. Application Data

(63) Continuation of application No. PCT/US2019/056631, filed on Oct. 17, 2019.

(60) Provisional application No. 62/747,283, filed on Oct. 18, 2018.

(51) Int. Cl.
| | |
|---|---|
| *C09J 4/00* | (2006.01) |
| *C08F 222/32* | (2006.01) |
| *C08K 5/14* | (2006.01) |
| *C08L 31/04* | (2006.01) |

(52) U.S. Cl.
CPC .............. *C09J 4/00* (2013.01); *C08F 222/322* (2020.02); *C08K 5/14* (2013.01); *C08L 31/04* (2013.01)

(58) Field of Classification Search
CPC ........... C09J 4/00; C08F 222/322; C08K 5/14
See application file for complete search history.

(56) References Cited

U.S. PATENT DOCUMENTS

| | | |
|---|---|---|
| 3,183,217 A | 5/1965 | Serniuk et al. |
| 3,963,772 A | 6/1976 | Takeshita |
| 4,102,945 A | 7/1978 | Gleave |
| 4,440,910 A | 4/1984 | O'Connor |
| 4,444,933 A | 4/1984 | Columbus et al. |
| 4,556,700 A | 12/1985 | Harris et al. |
| 4,560,723 A | 12/1985 | Millet et al. |
| 4,622,414 A | 11/1986 | Mckervey |
| 4,636,539 A | 1/1987 | Harris et al. |
| 4,695,615 A | 9/1987 | Leonard et al. |
| 4,718,966 A | 1/1988 | Harris et al. |
| 4,837,260 A | 6/1989 | Sato et al. |
| 4,855,461 A | 8/1989 | Harris et al. |
| 4,906,317 A | 3/1990 | Liu |
| 5,004,780 A | 4/1991 | Matsuyama et al. |
| 5,312,864 A | 5/1994 | Wenz et al. |
| 5,340,873 A | 8/1994 | Mitry |
| 5,382,635 A | 1/1995 | Mcinnis et al. |
| 5,506,283 A | 4/1996 | Mcinnis et al. |
| 5,530,037 A | 6/1996 | McDonnell et al. |
| 5,536,799 A | 7/1996 | Takahashi et al. |
| 5,607,985 A | 3/1997 | Masuhara et al. |
| 5,693,714 A | 12/1997 | Bauman et al. |
| 5,969,053 A | 10/1999 | Bauman et al. |
| 5,994,464 A | 11/1999 | Ohsawa et al. |
| 6,075,094 A | 6/2000 | Amekawa |
| 6,562,181 B2 | 5/2003 | Righettini |
| 6,607,632 B1 | 8/2003 | McDonnell et al. |
| 6,734,221 B1 | 5/2004 | Misiak |
| 6,833,196 B1 | 12/2004 | Wojciak |
| 9,371,470 B2 | 6/2016 | Barnes et al. |
| 2003/0196753 A1 | 10/2003 | Rainer et al. |
| 2003/0208002 A1* | 11/2003 | Woods .................. C08F 267/08 525/295 |
| 2008/0314519 A1 | 12/2008 | Attarwala et al. |
| 2010/0101724 A1 | 4/2010 | Schuft et al. |
| 2012/0302695 A1 | 11/2012 | Osae et al. |
| 2014/0275419 A1 | 9/2014 | Ward et al. |
| 2014/0329959 A1* | 11/2014 | Barnes ...................... C09J 4/06 524/553 |
| 2015/0005431 A1 | 1/2015 | Tanabiki |
| 2015/0191622 A1 | 7/2015 | Ming et al. |

FOREIGN PATENT DOCUMENTS

| | | | |
|---|---|---|---|
| JP | 56095966 | 8/1981 | |
| JP | S56127609 A | 10/1981 | |
| JP | S57165470 A | 10/1982 | |
| JP | H06145606 A | 5/1994 | |
| JP | 2007217484 A | 8/2007 | |
| JP | 2011236298 A * | 11/2011 | ............ C09J 109/06 |
| WO | 0118068 A1 | 3/2001 | |
| WO | 02092710 | 11/2002 | |
| WO | 2013111036 A1 | 8/2013 | |

OTHER PUBLICATIONS

JP2011236298A English Translation (Year: 2011).*
International Search Report issued in connection with International Patent Application No. PCT/US2019/056631 mailed on Mar. 10, 2020.
International Search Report issued in connection with International Patent Application No. PCT/US2019/057115 mailed on Mar. 10, 2020.
B. Schweitzer-Chaput et al., "Acid-Catalyzed Activation of Peroxyketals: Tunable Radical Initiation at Ambient Temperature and Below", Org. Lett., 18, 4944-47 (2016).
A. Prabhakar et al., "Structural Investigations of Polypropylene glycol (PPG) and Isophorone diisocyanate (IPDI)-based Polyurethane Prepolymer by 1D and 2D NMR Spectroscopy", J. Polym. Sci.: Part A: Polym. Chem., 43, 1196-1209 (2005).

* cited by examiner

*Primary Examiner* — Ling Siu Choi
*Assistant Examiner* — Huihong Qiao
(74) *Attorney, Agent, or Firm* — Steven C. Bauman

(57) ABSTRACT

Two-part cyanoacrylate/free radical curable adhesive systems are provided.

9 Claims, No Drawings

TWO-PART, CYANOACRYLATE/FREE RADICALLY CURABLE ADHESIVE SYSTEMS

BACKGROUND

Field

Two-part cyanoacrylate/free radically curable adhesive systems are provided.

Brief Discussion of Related Technology

Curable compositions such as cyanoacrylate adhesives are well recognized for their excellent ability to rapidly bond a wide range of substrates, generally in a number of minutes and depending on the particular substrate, often in a number of seconds.

Polymerization of cyanoacrylates is initiated by nucleophiles found under normal atmospheric conditions on most surfaces. The initiation by surface chemistry means that sufficient initiating species are available when two surfaces are in close contact with a small layer of cyanoacrylate between the two surfaces. Under these conditions a strong bond is obtained in a short period of time. Thus, in essence the cyanoacrylate often functions as an instant adhesive.

Cyanoacrylate adhesive performance, particularly durability, oftentimes becomes suspect when exposed to elevated temperature conditions and/or high relative humidity conditions. To combat these application-dependent shortcomings, a host of additives have been identified for inclusion in cyanoacrylate adhesive formulations. Improvements would still be seen as beneficial.

A variety of additives and fillers have been added to cyanoacrylate compositions to modify physical properties.

For instance, U.S. Pat. No. 3,183,217 (Serniuk) discloses free radical polymerization of a methacrylic acid or methyl methacrylate monomer with a non-polar or mildly polar olefin where the monomer is complexed with a Friedel-Crafts halide.

U.S. Pat. No. 3,963,772 (Takeshita) discloses liquid telomers of alkylene and acrylic monomers which result in short chain alternating copolymers substantially terminated at one end of the polymer chains with the more reactive alkylene units. The liquid telomers are useful in making elastomeric polymers for high molecular weight rubbers which permit the ready incorporation of fillers, additives, and the like, due to its liquid phase.

U.S. Pat. No. 4,440,910 (O'Connor) is directed to cyanoacrylate compositions having improved toughness, achieved through the addition of elastomers, i.e., acrylic rubbers. These rubbers are either (i) homopolymers of alkyl esters of acrylic acid; (ii) copolymers of another polymerizable monomer, such as lower alkenes, with an alkyl ester of acrylic acid or with an alkoxy ester of acrylic acid; (iii) copolymers of alkyl esters of acrylic acid; (iv) copolymers of alkoxy esters of acrylic acid; and (v) mixtures thereof.

U.S. Pat. No. 4,560,723 (Millet) discloses a cyanoacrylate adhesive composition containing a toughening agent comprising a core-shell polymer and a sustainer comprising an organic compound containing one or more unsubstituted or substituted aryl groups. The sustainer is reported to improve retention of toughness after heat aging of cured bonds of the adhesive. The core-shell polymer is treated with an acid wash to remove any polymerization-causing impurities such as salts, soaps or other nucleophilic species left over from the core-shell polymer manufacturing process.

U.S. Pat. No. 5,340,873 (Mitry) discloses a cyanoacrylate adhesive composition having improved toughness by including an effective toughening amount of a polyester polymer derived from a dibasic aliphatic or aromatic carboxylic acid and a glycol.

U.S. Pat. No. 5,994,464 (Ohsawa) discloses a cyanoacrylate adhesive composition containing a cyanoacrylate monomer, an elastomer miscible or compatible with the cyanoacrylate monomer, and a core-shell polymer being compatible, but not miscible, with the cyanoacrylate monomer.

U.S. Pat. No. 6,833,196 (Wojciak) discloses a method of enhancing the toughness of a cyanoacrylate composition between steel and EPDM rubber substrates. The disclosed method is defined by the steps of: providing a cyanoacrylate component; and providing a toughening agent comprising methyl methacrylic monomer and at least one of butyl acrylic monomer and isobornyl acrylic monomer, whereby the acrylic monomer toughening agent enhances the toughness of the cyanoacrylate composition such that whereupon cure, the cyanoacrylate composition has an average tensile shear strength of over about 4400 psi after 72 hours at room temperature cure and 2 hours post cure at 121° C.

Reactive acrylic adhesives that cure by free radical polymerization of (meth)acrylic esters (i.e., acrylates) are known, but suffer from certain drawbacks. Commercially important acrylic adhesives tend to have an offensive odor, particularly those that are made from methyl methacrylate. Methyl methacrylate-based acrylic adhesives also have low flash points (approximately 59° F.). Low flash points are particularly an issue during storage and transportation of the adhesives. If the flash point is 141° F. or lower, the U.S. Department of Transportation classifies the product as "Flammable" and requires marking and special storage and transportation conditions.

U.S. Pat. No. 6,562,181 (Righettini) intended to provide a solution to the problem addressed in the preceding paragraph by describing an adhesive composition comprising: (a) a trifunctional olefinic first monomer comprising an olefinic group that has at least three functional groups each bonded directly to the unsaturated carbon atoms of the olefinic group; (b) an olefinic second monomer that is copolymerizable with the first monomer; (c) a redox initiator system, and (d) a reactive diluent, where the composition is a liquid at room temperature is 100% reactive and substantially free of volatile organic solvent, and is curable at room temperature.

Recently, U.S. Pat. No. 9,372,470 (Burns) issued with claims directed to a two-part curable composition comprising (a) a first part comprising a cyanoacrylate component and t-butyl perbenzoate as a peroxide catalyst present in an amount from about 0.01% to about 10%, by weight of the cyanoacrylate component; and (b) a second part comprising a free radical curable component and a transition metal. When mixed together the peroxide catalyst initiates cure of the free radical curable component and the transition metal initiates cure of the cyanoacrylate component.

In technology unrelated to adhesive systems, let alone two-part adhesive systems, particularly where one of the parts is based on cyanoacrylate chemistry, B. Schweitzer-Chaput et al., "Acid-Catalyzed Activation of Peroxyketals: Tunable Radical Initiation at Ambient Temperature and Below", Org. Lett., 18, 4944-47 (2016) report on the use of acid catalysed peroxy ketals for radical initiation.

Notwithstanding the state of the art, it would be desirable to provide alternative adhesive systems having both the features of an instant adhesive, such as in terms of the fast fixture times and ability to bond a wide range of substrates such as metals and plastics observed with cyanoacrylates, together with the improved bond strength over a greater variety and/or selection of substrates seen with (meth) acrylate compositions. By so doing, the end user is given a greater variety of possible solutions from which to make a choice appropriate to the problem s/he is facing.

SUMMARY

There is provided in one aspect a two-part cyanoacrylate/free radically curable composition comprising:
(a) a first part comprising a cyanoacrylate component and an acidic component; and
(b) a second part comprising a free radical curable component and a peroxy acetal and/or ketal.

When mixed together the acidic component of the first part reacts with the peroxy acetal and/or ketal of the second part to initiate cure of the free radically curable component of the second part.

The compositions, which are room temperature stable as the first part and the second part do not interact prior to use on mixing, provide good performance across substrates constructed from a wide variety of materials and provide improved durability performance over conventional cyanoacrylate compositions and improved fixture time and improved bond strength over conventional free radical curable compositions.

DETAILED DESCRIPTION

Part A

The cyanoacrylate component includes cyanoacrylate monomers, such as those represented by $H_2C=C(CN)-COOR$, where R is selected from $C_{1-15}$ alkyl, $C_{2-15}$ alkoxyalkyl, $C_{3-15}$ cycloalkyl, $C_{2-15}$ alkenyl, $C_{7-15}$ aralkyl, $C_{6-15}$ aryl, $C_{3-15}$ allyl and $C_{1-15}$ haloalkyl groups. Desirably, the cyanoacrylate monomer is selected from methyl cyanoacrylate, ethyl-2-cyanoacrylate ("ECA"), propyl cyanoacrylates, butyl cyanoacrylates (such as n-butyl-2-cyanoacrylate), octyl cyanoacrylates, allyl cyanoacrylate, B-methoxyethyl cyanoacrylate and combinations thereof. A particularly desirable one is ethyl-2-cyanoacrylate.

The cyanoacrylate component should be included in the Part A composition in an amount within the range of from about 50 percent by weight to about 99.98 percent by weight, such as about 90 percent by weight to about 99 percent by weight being desirable, and about 92 percent by weight to about 97 percent by weight of the Part A composition being particularly desirable.

As the acidic component to be included in the Part A composition of the two-part adhesive system, a host of materials may be used. For instance, as the acidic component provides a stabilizing effect on the cyanoacrylate it also serves to liberate reactive, or more reactive, species form the peroxy acetal and/or ketal when Parts A and B are mixed together. Examples of suitable acidic components include sulfonic acid and derivatives thereof (such as 3-hydroxy propane sulfonic acid, p-toluenesulfonic acid and methane sulfonic acid), sulfuric acid, phosphoric acid, boron trifluoride and boron trifluoride etherate, nitric acid, trihaloacetic acids (such as trifluoroacetic acid and trichloroacetic acid), acetic acid, and scandium trifluoromethanesulfonate. The acidic component should be used in an amount greater than ordinarily used simply to stabilize the cyanoacrylate. For instance, ordinarily the acidic component may be used in an amount up to about 500 ppm to stabilize the cyanoacrylate against premature, and undesired, polymerization. Increasing the amount of the acidic component much beyond that tends to retard the ability of the cyanoacrylate to cure (without including additional additives, such as cure accelerators). However, in this case, increasing the amount permits the stabilizing effect to be realized as well as the activating effect the acidic component has on the peroxy acetal and/or ketal to generate radicals to initiate cure of the free radically curable component of Part B when Parts A and B are mixed.

Accordingly, the acidic component should be used in an amount of about 100 ppm to about 10 percent by weight, such as about 500 ppm to about 5 percent by weight.

Additives may be included in the Part A composition of the adhesive system to modify physical properties, such as improved fixture speed, improved shelf-life stability, flexibility, thixotropy, increased viscosity, color, and improved toughness. Such additives therefore may be selected from accelerators, free radical stabilizers, anionic stabilizers, gelling agents, thickeners [such as PMMAs], thixotropy conferring agents (such as fumed silica), dyes, toughening agents, plasticizers and combinations thereof.

One or more accelerators may also be used in the adhesive system, particularly, in the Part A composition, to accelerate cure of the cyanoacrylate component. Such accelerators may be selected from calixarenes and oxacalixarenes, silacrowns, crown ethers, cyclodextrins, poly(ethyleneglycol) di(meth) acrylates, ethoxylated hydric compounds and combinations thereof.

Of the calixarenes and oxacalixarenes, many are known, and are reported in the patent literature. See e.g. U.S. Pat. Nos. 4,556,700, 4,622,414, 4,636,539, 4,695,615, 4,718, 966, and 4,855,461, the disclosures of each of which are hereby expressly incorporated herein by reference.

For instance, as regards calixarenes, those within the structure below are useful herein:

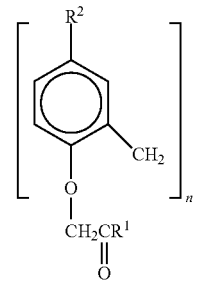

where $R^1$ is alkyl, alkoxy, substituted alkyl or substituted alkoxy; $R^2$ is H or alkyl; and n is 4, 6 or 8.

One particularly desirable calixarene is tetrabutyl tetra[2-ethoxy-2-oxoethoxy]calix-4-arene.

A host of crown ethers are known. For instance, examples which may be used herein either individually or in combination include 15-crown-5, 18-crown-6, dibenzo-18-crown-6, benzo-15-crown-5-dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4, 1,2-decalyl-15-crown-5, 1,2-naphtho-15-crown-5, 3,4,5-naphtyl-16-crown-5, 1,2-methyl-benzo-18-crown-6, 1,2-methylbenzo-5, 6-methylbenzo-18-crown-6, 1,2-t-butyl-18-crown-6, 1,2-vinylbenzo-15-crown-5, 1,2-vinylbenzo-18-crown-6, 1,2-t-butyl-cyclohexyl-18-crown-6, asym-dibenzo-22-crown-6 and 1,2-benzo-1,4-benzo-5-oxygen-20-crown-7. See U.S.

Pat. No. 4,837,260 (Sato), the disclosure of which is hereby expressly incorporated here by reference.

Of the silacrowns, again many are known, and are reported in the literature. For instance, a typical silacrown may be represented within the structure below:

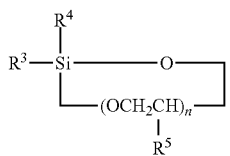

where $R^3$ and $R^4$ are organo groups which do not themselves cause polymerization of the cyanoacrylate monomer, $R^5$ is H or $CH_3$ and n is an integer of between 1 and 4. Examples of suitable $R^3$ and $R^4$ groups are R groups, alkoxy groups, such as methoxy, and aryloxy groups, such as phenoxy. The $R^3$ and $R^4$ groups may contain halogen or other substituents, an example being trifluoropropyl. However, groups not suitable as $R^4$ and $R^5$ groups are basic groups, such as amino, substituted amino and alkylamino.

Specific examples of silacrown compounds useful in the inventive compositions include:

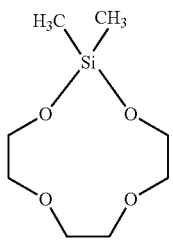

dimethylsila-11-crown-4;

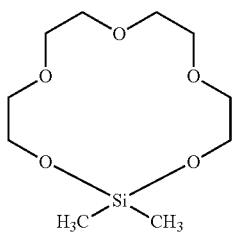 [SMILES: C[Si]1(C)OCCOCCOCCOCCO1]

dimethylsila-14-crown-5;

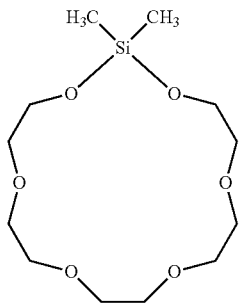 [SMILES: C[Si]1(C)OCCOCCOCCOCCOCCO1]

and dimethylsila-17-crown-6. See e.g. U.S. Pat. No. 4,906,317 (Liu), the disclosure of which is hereby expressly incorporated herein by reference.

Many cyclodextrins may be used in connection with the present invention. For instance, those described and claimed in U.S. Pat. No. 5,312,864 (Wenz), the disclosure of which is hereby expressly incorporated herein by reference, as hydroxyl group derivatives of an α, β or γ-cyclodextrin which is at least partly soluble in the cyanoacrylate would be appropriate choices for use herein as an accelerator component.

In addition, poly(ethylene glycol) di(meth)acrylates suitable for use herein include those within the structure below:

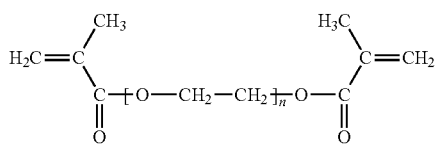

where n is greater than 3, such as within the range of 3 to 12, with n being 9 as particularly desirable. More specific examples include PEG 200 DMA (where n is about 4), PEG 400 DMA (where n is about 9), PEG 600 DMA (where n is about 14), and PEG 800 DMA (where n is about 19), where the number (e.g., 400) represents the average molecular weight of the glycol portion of the molecule, excluding the two methacrylate groups, expressed as grams/mole (i.e., 400 g/mol). A particularly desirable PEG DMA is PEG 400 DMA.

And of the ethoxylated hydric compounds (or ethoxylated fatty alcohols that may be employed), appropriate ones may be chosen from those within the structure below:

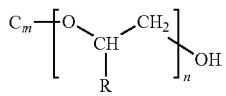

where $C_m$ can be a linear or branched alkyl or alkenyl chain, m is an integer between 1 to 30, such as from 5 to 20, n is an integer between 2 to 30, such as from 5 to 15, and R may be H or alkyl, such as $C_{1-6}$ alkyl.

In addition, accelerators embraced within the structure below:

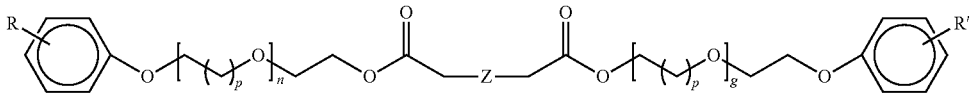

where R is hydrogen, $C_{1-6}$ alkyl, $C_{1-6}$ alkyloxy, alkyl thioethers, haloalkyl, carboxylic acid and esters thereof, sulfinic, sulfonic and sulfurous acids and esters, phosphinic, phosphonic and phosphorous acids and esters thereof, Z is a polyether linkage, n is 1-12 and p is 1-3 are as defined above, and R' is the same as R, and g is the same as n.

A particularly desirable chemical within this class as an accelerator component is

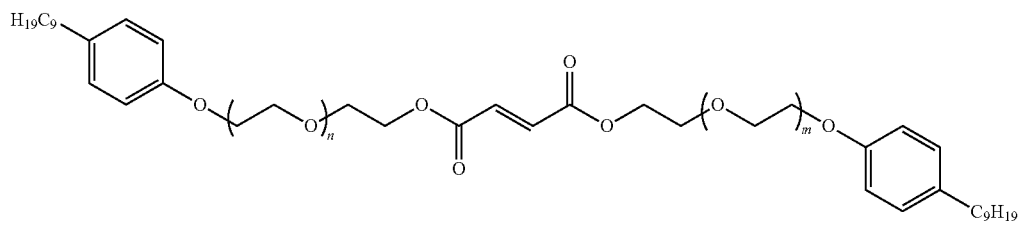

where n and m combined are greater than or equal to 12.

The accelerator should be included in the composition in an amount within the range of from about 0.01 percent by weight to about 10 percent by weight, with the range of about 0.1 to about 0.5 percent by weight being desirable, and about 0.4 percent by weight of the total composition being particularly desirable.

Stabilizers useful in the Part A composition of the adhesive system include free-radical stabilizers, anionic stabilizers and stabilizer packages that include combinations thereof. The identity and amount of such stabilizers are well known to those of ordinary skill in the art. See e.g. U.S. Pat. Nos. 5,530,037 and 6,607,632, the disclosures of each of which are hereby incorporated herein by reference. Commonly used free-radical stabilizers include hydroquinone, while commonly used anionic stabilizers include boron trifluoride, boron trifluoride-etherate, sulphur trioxide (and hydrolyis products thereof) and methane sulfonic acid.

Part B

The free radically curable component for use in the Part B composition of the adhesive system include (meth)acrylate monomers and oligomers, and maleimide-, itaconamide- or nadimide-containing compounds and combinations thereof.

(Meth)acrylate monomers for use in Part B of the composition of the adhesive system include a host of (meth)acrylate monomers, with some of the (meth)acrylate monomers being aromatic, while others are aliphatic and still others are cycloaliphatic. Examples of such (meth)acrylate monomers include di-or tri-functional (meth)acrylates like polyethylene glycol di(meth)acrylates, tetrahydrofuran (meth)acrylates and di(meth)acrylates, hydroxypropyl (meth)acrylate ("HPMA"), hexanediol di(meth)acrylate, trimethylol propane tri(meth)acrylate ("TMPTMA"), diethylene glycol dimethacrylate, triethylene glycol dimethacrylate ("TRIEGMA"), benzylmethacrylate, tetraethylene glycol dimethacrylate, dipropylene glycol dimethacrylate, di-(pentamethylene glycol) dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, such as ethoxylated bisphenol-A (meth)acrylate ("EBIPMA"), bisphenol-F mono and di(meth)acrylates, such as ethoxylated bisphenol-F (meth)acrylate, and methacrylate-functional urethanes.

The maleimide-, nadimide-, and itaconimide-containing compounds include those compounds having the following structures I, II and III, respectively

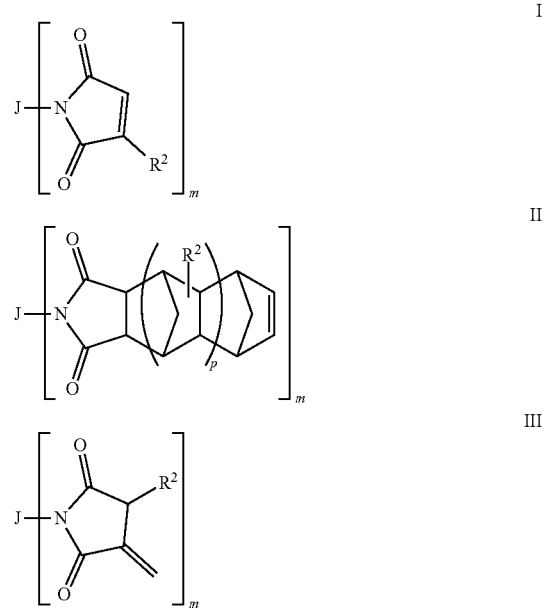

where:
  m=1-15,
  p=0-15,
    each $R^2$ is independently selected from hydrogen or lower alkyl, and
    J is a monovalent or a polyvalent moiety comprising organic or organosiloxane radicals, and combinations of two or more thereof.

More specific representations of the maleimides, itaconimides and nadimides include those corresponding to structures I, II, or III, where m=1-6, p=0, $R^2$ is independently selected from hydrogen or lower alkyl, and J is a monovalent or polyvalent radical selected from hydrocarbyl, substituted hydrocarbyl, heteroatom-containing hydrocarbyl, substituted heteroatom-containing hydrocarbyl, hydrocarbylene, substituted hydrocarbylene, heteroatom-containing hydrocarbylene, substituted heteroatom-containing hydrocarbylene, polysiloxane, polysiloxane-polyurethane block copolymer, and combinations of two or more thereof, optionally containing one or more linkers selected from a covalent bond, —O—, —S—, —NR—, —O—C(O)—, —O—C(O)—O—, —O—C(O)—NR—, —NR—C(O)—, —NR—C(O)—O—, —NR—C(O)—NR—, —S—C(O)—, —S—C(O)—O—, —S—C(O)—NR—, —S(O)—, —S(O)$_2$—, —O—S(O)$_2$—, —O—S(O)$_2$—O—, —O—S(O)$_2$—NR—, —O—S(O)—, —O—S(O)—O—, —O—S(O)—NR—, —O—NR—C(O)—, —O—NR—C(O)—O—, —O—NR—C(O)—NR—, —NR—O—C(O)—, —NR—O—C(O)—O—, —NR—O—C(O)—NR—, —O—NR—C(S)—, —O—NR—C(S)—O—, —O—NR—C(S)—NR—, —NR—O—C(S)—, —NR—O—C(S)—O—, —NR—O—C(S)—NR—, —O—C(S)—, —O—C(S)—O—, —O—C(S)—NR—, —NR—C(S)—, —NR—C(S)—O—, —NR—C(S)—NR—, —S—S(O)$_2$—, —S—S(O)$_2$—O—, —S—S(O)$_2$—NR—, —NR—O—S(O)—, —NR—O—S(O)—O—, —NR—O—S(O)—NR—, —NR—O—S(O)$_2$—, —NR—O—S(O)$_2$—O—, —NR—O—S(O)$_2$—NR—, —O—NR—S(O)—, —O—NR—S(O)—O—, —O—NR—S(O)—NR—, —O—NR—S(O)$_2$—O—, —O—NR—S(O)$_2$—NR—, —O—NR—S(O)$_2$—, —O—P(O)R$_2$—, —S—P(O)R$_2$—, —NR—P(O)R$_2$—, where each R is independently hydrogen, alkyl or substituted alkyl, and combinations of any two or more thereof.

When one or more of the above described monovalent or polyvalent groups contain one or more of the above described linkers to form the "J" appendage of a maleimide, nadimide or itaconimide group, as readily recognized by those of skill in the art, a wide variety of linkers can be produced, such as, for example, oxyalkyl, thioalkyl, aminoalkyl, carboxylalkyl, oxyalkenyl, thioalkenyl, aminoalkenyl, carboxyalkenyl, oxyalkynyl, thioalkynyl, aminoalkynyl, carboxyalkynyl, oxycycloalkyl, thiocycloalkyl, aminocycloalkyl, carboxycycloalkyl, oxycloalkenyl, thiocycloalkenyl, aminocycloalkenyl, carboxycycloalkenyl, heterocyclic, oxyheterocyclic, thioheterocyclic, aminoheterocyclic, carboxyheterocyclic, oxyaryl, thioaryl, aminoacyl, carboxyaryl, heteroaryl, oxyheteroaryl, thioheteroaryl, aminoheteroaryl, carboxyheteroaryl, oxyalkylaryl, thioalkylaryl, aminoalkylaryl, carboxyalkylaryl, oxyarylalkyl, thioarylalkyl, aminoarylalkyl, carboxyarylalkyl, oxyarylalkenyl, thioarylalkenyl, aminoarylalkenyl, carboxyarylalkenyl, oxyalkenylaryl, thioalkenylaryl, aminoalkenylaryl, carboxyalkenylaryl, oxyarylalkynyl, thioarylalkynyl, aminoarylalkynyl, carboxyarylalkynyl, oxyalkynylaryl, thioalkynylaryl, aminoalkynylaryl or carboxyalkynylaryl, oxyalkylene, thioalkylene, aminoalkylene, carboxyalkylene, oxyalkenylene, thioalkenylene, aminoalkenylene, carboxyalkenylene, oxyalkynylene, thioalkynylene, aminoalkynylene, carboxyalkynylene, oxycycloalkylene, thiocycloalkylene, aminocycloalkylene, carboxycycloalkylene, oxycycloalkenylene, thiocycloalkenyle aminoalkylarylene, carboxyalkylarylene, oxyarylalkylene, thioarylalkylene, aminoarylalkylene, carboxyarylalkylene, oxyarylalkenylene, thioarylalkenylene, aminoarylalkenylene, carboxyarylalkenylene, oxyarylalkenylene, thioarylalkenylene, aminoalkenylarylene, carboxyalkenylarylene, oxyarylalkynylene, thioarylalkynylene, aminoarylalkynylene, carboxy arylalkynylene, oxyalkynylarylene, thioalkynylarylene, aminoalkynylarylene, carboxyalkynylarylene, heteroarylene, oxyheteroarylene, thioheteroarylene, aminoheteroarylene, carboxyheteroarylene, heteroatom-containing di- or polyvalent cyclic moiety, oxyheteroatom-containing di- or polyvalent cyclic moiety, thioheteroatom-containing di- or polyvalent cyclic moiety, aminoheteroatom-containing di- or polyvalent cyclic moiety, carboxyheteroatom-containing di- or polyvalent cyclic moiety, disulfide, sulfonamide, and the like. ne, aminocycloalkenylene, carboxycycloalkenylene, oxyarylene, thioarylene, aminoarylene, carboxyarylene, oxyalkylarylene, thioalkylarylene, In another embodiment, maleimides, nadimides, and itaconimides contemplated for use in the practice of the present invention have the structures I, II, and III, where m=1-6, p 0-6, and J is selected from saturated straight chain alkyl or branched chain alkyl, optionally containing optionally substituted aryl moieties as substituents on the alkyl chain or as part of the backbone of the alkyl chain, and where the alkyl chains have up to about 20 carbon atoms;

a siloxane having the structure: —(C(R$^3$)$_2$)$_d$—[Si(R$^4$)$_2$—O]$_f$—Si(R$^4$)$_2$—(C(R$^3$)$_2$)$_e$—, —(C(R$^3$)$_2$)$_d$—C(R$^3$)—C(O)O—(C(R$^3$)$_2$)$_d$—[Si(R$^4$)$_2$—O]—Si(R$^4$)$_2$—(C(R$^3$)$_2$)$_e$—O(O)C—(C(R$^3$)$_2$)$_e$—, or —(C(R$^3$)$_2$)$_d$—C(R$^3$)—O(O)C—(C(R$^3$)$_2$)$_d$—[Si(R$^4$)$_2$—O]$_f$—Si(R$^4$)$_2$—(C(R$^3$)$_2$)$_e$—C(O)O—(C(R$^3$)$_2$)$_e$—, where:

each $R^3$ is independently hydrogen, alkyl or substituted alkyl, each $R^4$ is independently hydrogen, lower alkyl or aryl, d=1-10, e=1-10, and f=1-50;

a polyalkylene oxide having the structure:

$$[(CR_2)_r—O-]_f—(CR_2)_s—$$

wherein:

each R is independently hydrogen, alkyl or substituted alkyl, r=1-10, s=1-10, and f is as defined above;

aromatic groups having the structure:

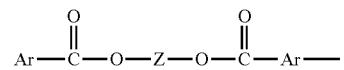

where:

each Ar is a monosubstituted, disubstituted or trisubstituted aromatic or heteroaromatic ring having in the range of 3 up to 10 carbon atoms, and Z is:

saturated straight chain alkylene or branched chain alkylene, optionally containing saturated cyclic moieties as substituents on the alkylene chain or as part of the backbone of the alkylene chain, or polyalkylene oxides having the structure:

$$—[(CR_2)_r—O-]_q—(CR_2)_s—$$

where:

each R is independently hydrogen, alkyl or substituted alkyl, r and s are each defined as above, and q falls in the range of 1 up to 50;

di- or tri-substituted aromatic moieties having the structure:

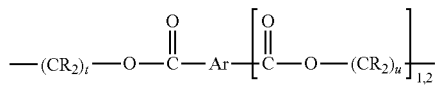

where:
each R is independently hydrogen, alkyl or substituted alkyl,
t falls in the range of 2 up to 10,
u falls in the range of 2 up to 10, and
Ar is as defined above;
aromatic groups having the structure:

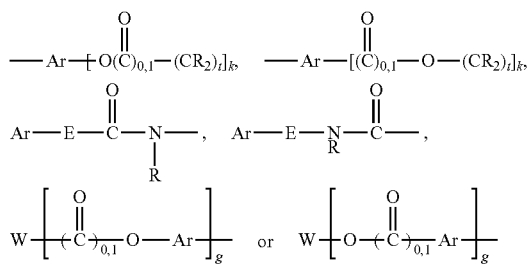

where:
each R is independently hydrogen, alkyl or substituted alkyl,
t=2-10,
k=1, 2 or 3,
g=1 up to about 50,
each Ar is as defined above,
E is —O— or —NR$^5$—, where R$^5$ is hydrogen or lower alkyl; and
W is straight or branched chain alkyl, alkylene, oxyalkylene, alkenyl, alkenylene, oxyalkenylene, ester, or polyester, a siloxane having the structure —(C(R$^3$)$_2$)$_d$—[Si(R$^4$)$_2$—O]$_f$—Si(R$^4$)$_2$—(C(R$^3$)$_2$)$_e$—, (C(R$^3$)$_2$)$_d$— C(R$^3$)—C(O)O—(C(R$^3$)$_2$)$_d$—[Si(R$^4$)$_2$—O]$_f$—Si(R$^4$)$_2$—(C(R$^3$)$_2$)$_e$—O(O)C—(C(R$^3$)$_2$)$_e$—, or —(C(R$^3$)$_2$)$_d$— C(R$^3$)—O(O)C—(C(R$^3$)$_2$)$_d$—[Si(R$^4$)$_2$—O]$_f$—Si(R$^4$)$_2$—(C(R$^3$)$_2$)$_e$—C(O)O—(C(R$^3$)$_2$)$_e$—, where:
each R$^3$ is independently hydrogen, alkyl or substituted alkyl,
each R$^4$ is independently hydrogen, lower alkyl or aryl,
d=1-10,
e=1-10, and
f=1-50;
a polyalkylene oxide having the structure:

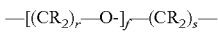

where:
each R is independently hydrogen, alkyl or substituted alkyl,
r=1-10,
s=1-10, and
f is as defined above;
optionally containing substituents selected from hydroxy, alkoxy, carboxy, nitrile, cycloalkyl or cycloalkenyl;
a urethane group having the structure:
R$^7$—U—C(O)—NR$^6$—R$^8$—NR$^6$—C(O)—(O—R$^8$—O—C(O)—NR$^6$—R$^8$—NR$^6$—C(O))$_v$—U—R$^8$— where:
each R$^6$ is independently hydrogen or lower alkyl,
each R$^7$ is independently an alkyl, aryl, or arylalkyl group having 1 to 18 carbon atoms,
each R$^8$ is an alkyl or alkyloxy chain having up to about 100 atoms in the chain, optionally substituted with Ar,
U is —O—, —S—, —N(R)—, or —P(L)$_{1,2}$-,
where R as defined above, and where each L is independently =O, =S, —OR or —R; and
v=0-50;
polycyclic alkenyl; or mixtures of any two or more thereof.

In a more specific recitation of such maleimide-, nadimide-, and itaconimide-containing compounds of structures I, II and III, respectively, each R is independently hydrogen or lower alkyl (such as C$_{1-4}$), -J- comprises a branched chain alkyl, alkylene, alkylene oxide, alkylene carboxyl or alkylene amido species having sufficient length and branching to render the maleimide, nadimide and/or itaconimide compound a liquid, and m is 1, 2 or 3.

Particularly desirable maleimide-containing compounds include those have two maleimide groups with an aromatoic group therebetween, such as a phenyl, biphenyl, bisphenyl or napthyl linkage.

In addition to the free radically curable component, Part B also includes a peroxy acetal and/or ketal.

The peroxy acetal and/or ketal may be embraced by:

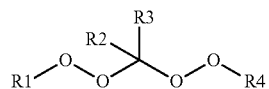

A where here R1, R2, R3 and R4 may each independently be selected from hydrogen, C$_{1-6}$ alkyl, C$_{5-7}$ cycloalkyl, C$_{1-6}$ alkoxy, C$_{1-6}$ peroxy alkyl, C$_{5-7}$ aryl, and C$_{6-10}$ alkaryl. And R1 and R4 taken together may form a cyclic ring with at least two, and sometimes at least three, peroxy linkages as part of the ring. More specifically, R1 and R4 may be tert-butyl and R2 and R3 may be cyclohexane; R1 may be tert-butyl, R2 and R3 may be cyclohexane, and R4 may be methoxy; R1 and R4 may be tert-butyl, R2 may be ethyl, and R3 may be methyl; R1 and R4 may be tert-butyl, R2 may be phenyl, and R3 may be ethyl; R1 and R4 may be tert-butyl, R2 may be phenyl, and R3 may be 1-phenyl methyl; and R1 and R4 may be Cert-butyl, R2 may be hydrogen, and R3 may be 1-phenyl methyl. And even more specifically, structure A may be selected from

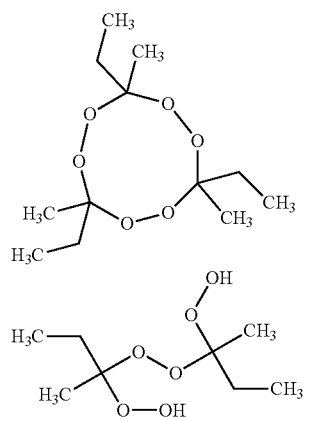

-continued

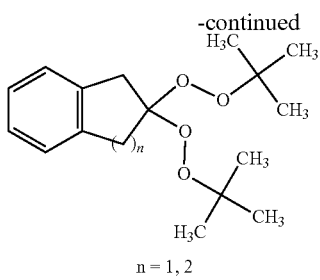

n = 1, 2

Examples of the peroxy acetal and/or ketal also include the following ones commercially available from Arkema, Philadelphia, Pennsylvania:

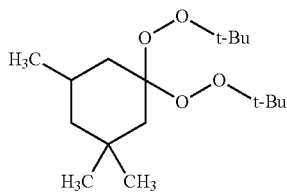 [SMILES: CC1CC(C)(C)CC(OOC(C)(C)C)(OOC(C)(C)C)C1]

Luperox® 231 (Luperox® 231M90/231M50) and Luperox® 231XL40, each of which is 1,1-Di(t-butylperoxy)-3,3,5-trimethylcyclohexane;

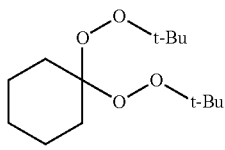

Luperox® 331 polymer initiator (Luperox® 331M80/331M50), 1,1-Di(t-butylperoxy)-cyclohexane;

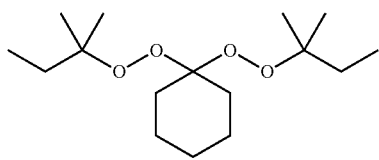 [SMILES: CCC(C)(C)OOC1(OOC(C)(C)CC)CCCCC1]

Luperox® 531 polymer initiator (Luperox® 531M60/531M80), 1,1-Di(t-amylperoxy)-cyclohexane;

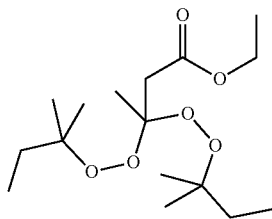 [SMILES: CCOC(=O)CC(C)(OOC(C)(C)CC)OOC(C)(C)CC]

Luperox® 533M65 polymer initiator, Ethyl 3,3-Di-(t-amylperoxy) butyrate.

Typically, the amount of peroxy acetal and/or ketal should fall in the range of about 0.001 percent by weight up to about 10.00 percent by weight of the composition, desirably about 0.01 percent by weight up to about 7.50 percent by weight of the composition, such as about 0.50 to about 5.00 percent by weight of the composition.

As discussed above, additives may be included in either or both of the Part A or the Part B compositions to influence a variety of performance properties.

Fillers contemplated for use include, for example, aluminum nitride, boron nitride, silicon carbide, diamond, graphite, beryllium oxide, magnesia, silicas, such as fumed silica or fused silica, alumina, perfluorinated hydrocarbon polymers (i.e., TEFLON), thermoplastic polymers, thermoplastic elastomers, mica, glass powder and the like. Preferably, the particle size of these fillers will be about 20 microns or less.

As regards silicas, the silica may have a mean particle diameter on the nanoparticle size; that is, having a mean particle diameter on the order of $10^{-9}$ meters. The silica nanoparticles can be pre-dispersed in epoxy resins and may be selected from those available under the tradename NANOPOCRYL, from Nanoresins, Germany. NANOCRYL is a tradename for a product family of silica nanoparticle reinforced (meth)acrylates. The silica phase consists of surface-modified, synthetic $SiO_2$ nanospheres with less than 50 nm diameter and an extremely narrow particle size distribution. The $SiO_2$ nanospheres are agglomerate-free dispersions in the (meth)acrylate matrix resulting in a low viscosity for resins containing up to 50 percent by weight silica.

The silica component should be present in an amount in the range of about 1 to about 60 percent by weight, such as about 3 to about 30 percent by weight, desirably about 5 to about 20 percent by weight, based on the total weight of the composition.

Tougheners contemplated for use particularly in the Part A composition include elastomeric polymers selected from elastomeric copolymers of a lower alkene monomer and (i) acrylic acid esters, (ii) methacrylic acid esters or (iii) vinyl acetate, such as acrylic rubbers; polyester urethanes; ethylene-vinyl acetates; fluorinated rubbers; isoprene-acrylonitrile polymers; chlorosulfinated polyethylenes; and homopolymers of polyvinyl acetate were found to be particularly useful. [See U.S. Pat. No. 4,440,910 (O'Connor), the disclosures of each of which are hereby expressly incorporated herein by reference.]

The elastomeric polymers are described in the '910 patent as either homopolymers of alkyl esters of acrylic acid; copolymers of another polymerizable monomer, such as lower alkenes, with an alkyl or alkoxy ester of acrylic acid; and copolymers of alkyl or alkoxy esters of acrylic acid. Other unsaturated monomers which may be copolymerized with the alkyl and alkoxy esters of acrylic include diener, reactive halogen-containing unsaturated compounds and other acrylic monomers such as acrylamides.

For instance, one group of such elastomeric polymers are copolymers of methyl acrylate and ethylene, manufactured by DuPont, under the name of VAMAC, such as VAMAC N123 and VAMAC B-124. VAMAC N123 and VAMAC B-124 are reported by DuPont to be a master batch of ethylene/acrylic elastomer. The DuPont material VAMAC G is a similar copolymer but contains no fillers to provide color or stabilizers. VAMAC VCS rubber appears to be the base rubber, from which the remaining members of the VAMAC product line are compounded. VAMAC VCS (also known as VAMAC MR) is a reaction product of the combination of ethylene, methyl acrylate and monomers having carboxylic acid cure sites, which once formed is then substantially free of processing aids (such as the release agents octadecyl amine, complex organic phosphate esters and/or stearic acid), and anti-oxidants (such as substituted diphenyl amine).

DuPont provides to the market under the trade designation VAMAC VMX 1012 and VCD 6200, rubbers which are made from ethylene and methyl acrylate. It is believed that the VAMAC VMX 1012 rubber possesses little to no carboxylic acid in the polymer backbone. Like the VAMAC VCS rubber, the VAMAC VMX 1012 and VCD 6200 rubbers are substantially free of processing aids such as the release agents octadecyl amine, complex organic phosphate esters and/or stearic acid, and anti-oxidants, such as substituted diphenyl amine, noted above. All of these VAMAC elastomeric polymers are useful herein.

In addition, vinylidene chloride-acrylonitrile copolymers [see U.S. Pat. No. 4,102,945 (Gleave)] and vinyl chloride/vinyl acetate copolymers [see U.S. Pat. No. 4,444,933 (Columbus)] may be included in the Part A composition. Of course, the disclosures of each these U.S. patents are hereby incorporated herein by reference in their entirety.

Copolymers of polyethylene and polyvinyl acetate, available commercially under the trade name LEVAMELT by LANXESS Limited, are useful.

A range of LEVAMELT-branded copolymers are available and includes for example, LEVAMELT 400, LEVAMELT 600 and LEVAMELT 900. The LEVAMELT products differ in the amount of vinyl acetate present. For example, LEVAMELT 400 comprises an ethylene-vinyl acetate copolymer comprising 40 percent by weight vinyl acetate. The LEVAMELT products are supplied in granular form. The granules are almost colorless and dusted with silica and talc. LEVAMELT consists of methylene units forming a saturated main chain with pendant acetate groups. The presence of a fully saturated main chain is an indication that LEVAMELT-branded copolymers are particularly stable; they do not contain any reactive double bonds which make conventional rubbers prone to aging reactions, ozone and UV light. The saturated backbone is reported to make the polymer robust.

Interestingly, depending on the ratio of polyethylene/polyvinylacetate, the solubilities of these LEVAMELT elastomers change in different monomers and also the ability to toughen changes as a result of the solubility.

The LEVAMELT elastomers are available in pellet form and are easier to formulate than other known elastomeric toughening agents.

LEVAPREN-branded copolymers, also from Lanxess, may also be used.

VINNOL surface coating resins available commercially from Wacker Chemie AG, Munich, Germany represent a broad range of vinyl chloride-derived copolymers and terpolymers that are promoted for use in different industrial applications. The main constituents of these polymers are different compositions of vinyl chloride and vinyl acetate. The terpolymers of the VINNOL product line additionally contain carboxyl or hydroxyl groups. These vinyl chloride/vinyl acetate copolymers and terpolymers may also be used.

VINNOL surface coating resins with carboxyl groups are terpolymers of vinyl chloride, vinyl acetate and dicarboxylic acids, varying in terms of their molar composition and degree and process of polymerization. These terpolymers are reported to show excellent adhesion, particularly on metallic substrates.

VINNOL surface coating resins with hydroxyl groups are copolymers and terpolymers of vinyl chloride, hydroxyacrylate and dicarboxylate, varying in terms of their composition and degree of polymerization.

VINNOL surface coating resins without functional groups are copolymers of vinyl chloride and vinyl acetate of variable molar composition and degree of polymerization.

Rubber particles, especially rubber particles that have relatively small average particle size (e.g., less than about 500 nm or less than about 200 nm), may also be included, particularly in the Part B composition. The rubber particles may or may not have a shell common to known core-shell structures.

In the case of rubber particles having a core-shell structure, such particles generally have a core comprised of a polymeric material having elastomeric or rubbery properties (i.e., a glass transition temperature less than about 0° C., e.g., less than about −30° C.) surrounded by a shell comprised of a non-elastomeric polymeric material (i.e., a thermoplastic or thermoset/crosslinked polymer having a glass transition temperature greater than ambient temperatures, e.g., greater than about 50° C.). For example, the core may be comprised of a diene homopolymer or copolymer (for example, a homopolymer of butadiene or isoprene, a copolymer of butadiene or isoprene with one or more ethylenically unsaturated monomers such as vinyl aromatic monomers, (meth)acrylonitrile, (meth)acrylates, or the like) while the shell may be comprised of a polymer or copolymer of one or more monomers such as (meth)acrylates (e.g., methyl methacrylate), vinyl aromatic monomers (e.g., styrene), vinyl cyanides (e.g., acrylonitrile), unsaturated acids and anhydrides (e.g., acrylic acid), (meth)acrylamides, and the like having a suitably high glass transition temperature. Other rubbery polymers may also be suitably be used for the core, including polybutylacrylate or polysiloxane elastomer (e.g., polydimethylsiloxane, particularly crosslinked polydimethylsiloxane).

Typically, the core will comprise from about 50 to about 95 percent by weight of the rubber particles while the shell will comprise from about 5 to about 50 percent by weight of the rubber particles.

Preferably, the rubber particles are relatively small in size. For example, the average particle size may be from about 0.03 to about 2 microns or from about 0.05 to about 1 micron. The rubber particles may have an average diameter of less than about 500 nm, such as less than about 200 nm. For example, the core-shell rubber particles may have an average diameter within the range of from about 25 to about 200 nm.

When used, these core shell rubbers allow for toughening to occur in the composition and oftentimes in a predictable manner—in terms of temperature neutrality toward cure—because of the substantial uniform dispersion, which is ordinarily observed in the core shell rubbers as they are offered for sale commercially.

In the case of those rubber particles that do not have such a shell, the rubber particles may be based on the core of such structures.

Desirably, the rubber particles are relatively small in size. For example, the average particle size may be from about 0.03 to about 2µ or from about 0.05 to about 1µ. In certain embodiments of the invention, the rubber particles have an average diameter of less than about 500 nm. In other embodiments, the average particle size is less than about 200 nm. For example, the rubber particles may have an average diameter within the range of from about 25 to about 200 nm or from about 50 to about 150 nm.

The rubber particles may be used in a dry form or may be dispersed in a matrix, as noted above.

Typically, the composition may contain from about 5 to about 35 percent by weight rubber particles.

Combinations of different rubber particles may advantageously be used in the present invention. The rubber particles may differ, for example, in particle size, the glass transition temperatures of their respective materials, whether, to what extent and by what the materials are functionalized, and whether and how their surfaces are treated.

Rubber particles that are suitable for use in the present invention are available from commercial sources. For example, rubber particles supplied by Eliokem, Inc. may be used, such as NEP R0401 and NEP R401S (both based on acrylonitrile/butadiene copolymer); NEP R0501 (based on carboxylated acrylonitrile/butadiene copolymer; CAS No. 9010-81-5); NEP R0601A (based on hydroxy-terminated polydimethylsiloxane; CAS No. 70131-67-8); and NEP R0701 and NEP 0701S (based on butadiene/styrene/2-vinylpyridine copolymer; CAS No. 25053-48-9). Also, those available under the PARALOID tradename, such as PARALOID 2314, PARALOID 2300, and PARALOID 2600, from Dow Chemical Co., Philadelphia, PA, and those available under the STAPHYLOID tradename, such as STAPHYLOID AC-3832, from Ganz Chemical Co., Ltd., Osaka, Japan.

Rubber particles that have been treated with a reactive gas or other reagent to modify the outer surfaces of the particles by, for instance, creating polar groups (e.g., hydroxyl groups, carboxylic acid groups) on the particle surface, are also suitable for use herein. Illustrative reactive gases include, for example, ozone, $Cl_2$, $F_2$, $O_2$, $SO_3$, and oxidative gases. Methods of surface modifying rubber particles using such reagents are known in the art and are described, for example, in U.S. Pat. Nos. 5,382,635; 5,506,283; 5,693,714; and 5,969,053, each of which being hereby expressly incorporated herein by reference in its entirety. Suitable surface modified rubber particles are also available from commercial sources, such as the rubbers sold under the tradename VISTAMER by Exousia Corporation.

Where the rubber particles are initially provided in dry form, it may be advantageous to ensure that such particles are well dispersed in the adhesive composition prior to curing the adhesive composition. That is, agglomerates of the rubber particles are preferably broken up so as to provide discrete individual rubber particles, which may be accomplished by intimate and thorough mixing of the dry rubber particles with other components of the adhesive composition.

Thickeners are also useful.

Stabilizers and inhibitors may also be employed to control and prevent premature peroxide decomposition and polymerization. The inhibitors may be selected from hydroquinones, benzoquinones, naphthoquinones, phenanthroquinones, anthraquinones, and substituted compounds thereof. Various phenols may also be used as inhibitors, such as 2,6-ditertiary-butyl-4-methyl phenol. The inhibitors may be used in quantities of about 0.1 percent by weight to about 1.0 percent by weight by weight of the total composition without adverse effect on the curing rate of the polymerizable adhesive composition.

At least one of the first part or the second part may also include an organic acid having a $pK_a$ of about 12 or less, such as sulfimides, sulfonamides, citric acid, maleic acid, succinic acid, phthalic acid, di-carboxylic acid, maleic anhydride, maleic dianhydride, succinic anhydride, and phthalic anhydride.

In practice, each of the Part A and the Part B compositions are housed in separate containment vessels in a device prior to use, where in use the two parts are expressed from the vessels mixed and applied onto a substrate surface. The vessels may be chambers of a dual chambered cartridge, where the separate parts are advanced through the chambers with plungers through an orifice (which may be a common one or adjacent ones) and then through a mixing dispense nozzle. Or the vessels may be coaxial or side-by-side pouches, which may be cut or torn and the contents thereof mixed and applied onto a substrate surface.

The invention will be more readily appreciated by a review of the examples, which follow.

EXAMPLES

Reference to ECA means ethyl-2-cyanoacrylate.

With reference to Table 1, an adhesive system was prepared where the Part A composition was based on ECA, mixed with t-BPB together with a boron trifluoride/methane sulfonic acid/sulfuric acid combination as an acidic component, and an ethylene/vinyl acetate copolymer. The Part B composition was based on an acrylate urethane ester, HPMA, and an epoxy acrylate, as reported by the manufacturer, Sartomer, together with a commercially available peroxy ketal. The specific amount of each constituent is listed in Table 1.

TABLE 1

| Part A | | |
|---|---|---|
| Components | | Sample/Amt (wt %) |
| Type | Identity | A1 |
| Cyanoacrylate | ECA | 68.9 |
| Peroxide | t-BPB | 5.0 |
| Acid | $BF_3$/MSA/$H_2SO_4$ | 4.5 |
| Toughener | LEVAPREN 900* | 22.5 |

*Ethylene/vinyl acetate copolymer, available commercially from Lanxess Ltd.

| Part B | | |
|---|---|---|
| Components | | Sample/Amt (wt %) |
| Type | Identity | B1 |
| (Meth) acrylate | Acrylated Urethane Ester[1] | 44.2 |
| | HPMA | 27.3 |
| | CN2003U[2] | 23.2 |
| Peroxy Ketal | LUPEROX 331M80 | 5.2 |

[1] made in sequential steps from the reaction of diols and dicarboxylic acids to form polyester diols, followed by reaction with toluene diisocyanate and finally capping with hydroxy propyl (meth) acrylate
[2] Epoxy acrylate, as reported by the manufacturer, Sartomer division of Arkema The adhesive system set forth in Table 1 mixed together, was applied to a pair of substrates which were mated in an overlapped, off-set manner with the adhesive system disposed therebetween and allowed to cure for a period of time of about 24 hours at room temperature. The adhesive system formed an adhesive bond between the substrates.

What is claimed is:
1. A two-part curable composition comprising:
   (a) a first part comprising a cyanoacrylate component and an acidic component; and
   (b) a second part comprising a free radical curable component and a peroxy acetal and/or ketal,
   wherein the peroxy acetal and/or ketal is present in an amount from about 0.05 to about 5 percent by weight of the composition and is embraced by

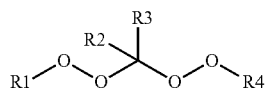

wherein here R1, R2, R3 and R4 are each independently selected from hydrogen, $C_{1-6}$ alkyl, $C_{5-7}$ cycloalkyl, alkoxy, $C_{1-6}$ peroxy alkyl, $C_{5-7}$ aryl, and $C_{6-10}$ alkaryl, and R1 and R4 taken together form a cyclic ring with at least two peroxy linkages as part of the ring, wherein the peroxy acetal and/or ketal is one or more of:
A. wherein R1 and R4 are each tert-butyl and R2 and R3 are each hydrogen or cyclohexane;
B. wherein R1 is tert-butyl, R2 and R3 are each cyclohexane, and R4 is methoxy;
C. wherein R1 and R4 are each tert-butyl, R2 is ethyl, and R3 is methyl;
D. wherein R1 and R4 are each tert-butyl, R2 is phenyl, and R3 is ethyl;
E. wherein R1 and R4 are each tert-butyl, R2 is phenyl, and R3 is 1-phenyl methyl; and
F. wherein R1 and R4 are each tert-butyl, R2 is hydrogen, and R3 is 1-phenyl methyl.

2. The composition of claim 1, wherein when Parts A and B are mixed together the acidic component liberates reactive species from the peroxy acetal and/or ketal thereby initiating cure of the free radical curable component.

3. The composition of claim 1, wherein the cyanoacrylate component comprises $H_2C=C(CN)-COOR$, wherein R is selected from alkyl, alkoxyalkyl, cycloalkyl, alkenyl, aralkyl, aryl, allyl and haloalkyl groups.

4. The composition of claim 1, wherein the free radical curable component is selected from a (meth)acrylate component, maleimide-, itaconamide- or nadimide-containing compounds, or combinations thereof.

5. The composition of claim 1, wherein the free radical curable component is a (meth)acrylate component selected from the group consisting of polyethylene glycol di(meth)acrylates, tetrahydrofuran (meth)acrylates and di(meth)acrylates, hydroxypropyl (meth)acrylate, hexanediol di(meth)acrylate, trimethylol propane tri(meth)acrylate, diethylene glycol dimethacrylate, triethylene glycol dimethacrylate, benzylmethacrylate, tetraethylene glycol dimethacrylate, dipropylene glycol dimethacrylate, di-(pentamethylene glycol) dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, and methacrylate-functional urethanes.

6. The composition of claim 1, wherein the first part is housed in a first chamber of a dual chamber syringe and the second part is housed in a second chamber of the dual chamber syringe.

7. The composition of claim 1, wherein at least one of the first part or the second part further comprises at least one of a plasticizer, a filler and a toughener.

8. The composition of claim 7, wherein the toughener is a member selected from the group consisting of (a) reaction products of the combination of ethylene, methyl acrylate and monomers having carboxylic acid cure sites, (b) dipolymers of ethylene and methyl acrylate, (c) combinations of (a) and (b), (4) vinylidene chloride-acrylonitrile copolymers, (5) vinyl chloride/vinyl acetate copolymer, (6) copolymers of polyethylene and polyvinyl acetate, and combinations thereof.

9. The composition of claim 1, wherein the first part and the second part are present in a ratio of about 1:1 by volume.

* * * * *